United States Patent

Yerman

[15] 3,679,992

[45] July 25, 1972

[54] TUNNEL DIODE OSCILLATOR FM TEMPERATURE SENSOR

[72] Inventor: Alexander J. Yerman, Scotia, N.Y.

[73] Assignee: General Electric Company

[22] Filed: June 1, 1971

[21] Appl. No.: 149,011

Related U.S. Application Data

[63] Continuation-in-part of Ser. No. 883,787, Dec. 10, 1969, abandoned.

[52] U.S. Cl. ............................331/66, 73/362 SC, 307/310, 307/322, 331/107 T, 331/177 R

[51] Int. Cl. ........................................G01k 7/00, H03b 7/08

[58] Field of Search .....................331/107 T, 66, 176, 177 R; 73/359, 362 SC; 307/278, 286, 322, 310

[56] References Cited

UNITED STATES PATENTS

| | | | |
|---|---|---|---|
| 3,158,027 | 11/1964 | Kibler | 73/362 SC |
| 3,249,891 | 5/1966 | Rutz | 331/107 T |
| 3,260,116 | 7/1966 | Grady, Jr. | 73/362 SC |
| 3,324,725 | 6/1967 | Yerman | 331/107 T X |

*Primary Examiner*—Roy Lake
*Assistant Examiner*—Siegfried H. Grimm
*Attorney*—John F. Ahern et al.

[57] ABSTRACT

In a tunnel diode oscillator used as a temperature sensor including a second tunnel diode to shift the bias for the tunnel diode oscillator with temperature changes, an approximately linear relationship is obtained between temperature and output frequency. A further correction is provided by having temperature variations induce strains in the substrate material of the tunnel diode which will further modify the output frequency in accordance with temperature variations.

4 Claims, 5 Drawing Figures

Inventor:
Alexander J. Yerman,
by Paul A. Frank

Inventor:
Alexander J. Yerman,
by Paul A. Frank

TUNNEL DIODE OSCILLATOR FM TEMPERATURE SENSOR

This is a continuation-in-part of application Ser. No. 883,787, filed Dec. 10, 1969, assigned to the same assignee as the present invention and now abandoned.

Although known as a temperature sensitive device, the tunnel diode is not widely used as a temperature sensor. When used in an oscillator configuration, the output frequency is a non-linear function of temperature, requiring the device to be calibrated at many points over its range of operation.

As is known, a plot of the frequency vs. bias characteristics of a tunnel diode oscillator produces a separate curve for different operating temperatures; for example, 0°, 25°, and 60° C. The peak frequency of each curve occurs at a different bias voltage for each temperature. This displacement of the peak frequencies causes the non-linearity discussed above.

It has been found, however, that if the bias to the oscillator is adjusted so that the oscillator operates at maximum frequency, the relationship between output frequency and temperatures becomes very nearly linear.

It is, therefore, an object of the present invention to provide a linear temperature sensor utilizing a tunnel diode oscillator.

It is a further object to provide a linearized tunnel diode oscillator utilizing a temperature sensitive bias correction circuit.

It is another object of this invention to provide a tunnel diode oscillator utilizing temperature induced strains in the substrate of the tunnel diode as a secondary correction for non-linearities in the output frequency vs. temperature characteristic of the oscillator.

These objects are achieved by the present invention in which a pair of tunnel diodes are used in a sensor probe. One of the tunnel diodes used in an oscillator circuit as an FM temperature sensor. The other tunnel diode is connected to the voltage supply circuit so as to modify the bias voltage to the oscillator in accordance with temperature variations. By having the tunnel diodes formed on the same substrate, temperature variations affect the two diodes in like manner and simultaneously.

As a secondary correction for non-linearities, the common substrate can be fastened to an insulating member having a temperature coefficient of expansion different from that of the substrate. Temperature changes will then induce strains in the substrate, which further modify the output frequency of the oscillator. These variations with temperature can be utilized to compensate for those non-linearities not corrected by the second tunnel diode.

The invention may be more fully understood by considering the following description in conjunction with the attached drawings in which.

Figure 1:
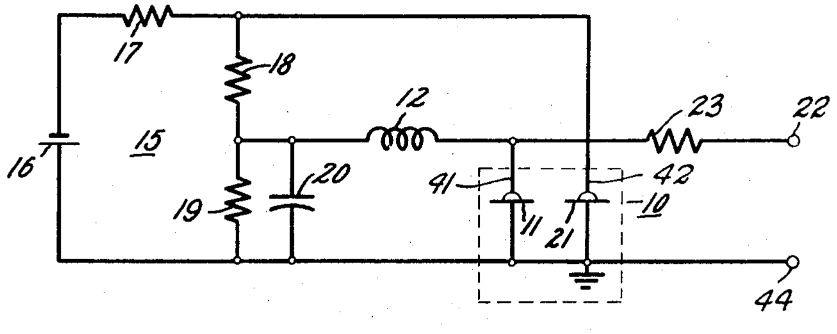
FIG. 1 is a schematic circuit diagram of a preferred embodiment of the present invention.

Referring to FIG. 1, there is shown a preferred embodiment of the present invention wherein a compensated tunnel diode oscillator is used as a frequency modulated temperature sensor. Specifically, in FIG. 1, there is shown a sensor 10 comprising tunnel diodes 11 and 21. Ordinary silicon or germanium tunnel diodes can be used, or any of the specially constructed devices described in my U.S. Pat. No. 3,277,717, granted Oct. 11, 1966, entitled "Sensing Device and Arrangement" and assigned to the same assignee. Also see divisional U.S. Pat. No. 3,324,725, granted June 13, 1967. The tunnel diode 11 is the oscillator diode and is coupled to a source of bias voltage 15 by an impedance element or inductor 12 which serves to tune the tunnel diode oscillator. The source of bias voltage 15 comprises a battery 16 and series connected resistances 17, 18, and 19, resistance 19 having a filtering capacitor 20 connected in parallel therewith. Also, connected to the source of bias voltage 15 is the tunnel diode 21, connected to the junction of resistors 17 and 18. The output frequency is taken across s tunnel diode 11, between terminals 22 and 44, resistor 23 being an isolating resistor.

Figure 2:
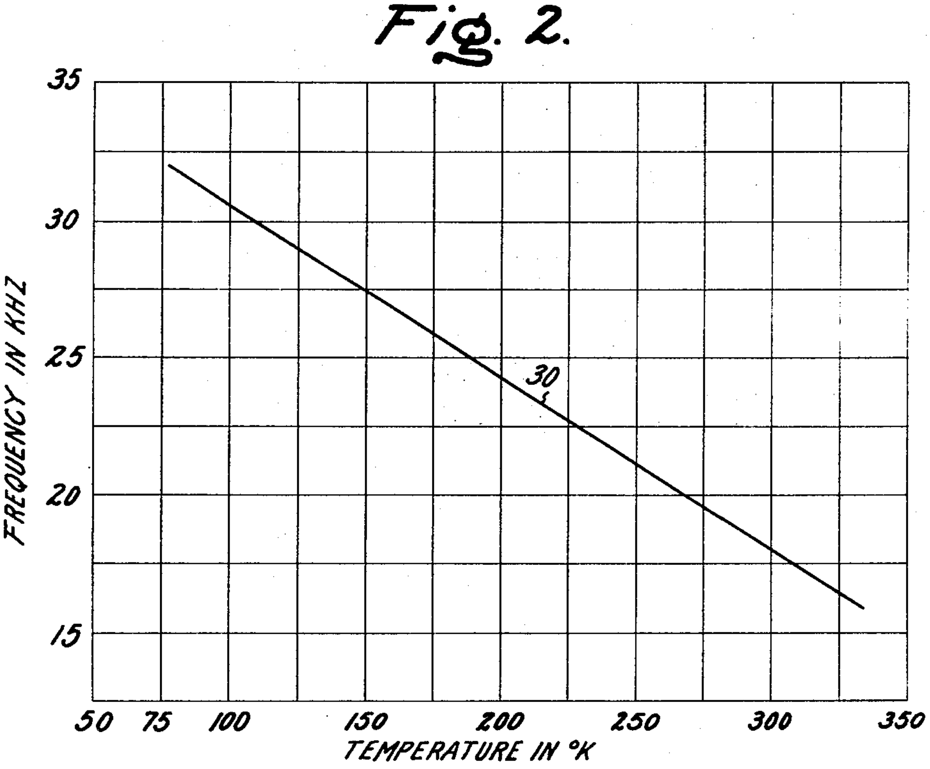
FIG. 2 shows a graph of the output frequency vs. temperature characteristic of a temperature sensor in accordance which the present invention.

In operation, the tunnel diodes 11 and 21 make up the sensor probe 10 and are physically near each other so that variations in temperature will affect both diodes simultaneously. The tunnel diode 11 is biased in the negative resistance region and acts as the oscillating diode somewhat in the manner of a relaxation oscillator. The operation of the basic tunnel diode oscillator is well known, and the aforementioned U.S. Pat. No. 3,277,717 may be referred to for further information if needed. Briefly, with reference to the typical negative resistance current-voltage characteristic such as is illustrated in FIG. 2 of this patent, during the first part of a new cycle during build up of current in inductor 12, the circuit current rises to the peak current point $I_p$ and the diode switches to the high voltage state $V_{pf}$. Upon the discharge of inductor 12, The diode current decreases to the vally current $I_v$ and the diode switches to the low voltage state $V_1$. The frequency of oscillation depends of course on the values of inductor 12 and the biasing circuit. Once having set these values, it is known that the frequency changes due to changes in electrical parameters such as bias voltage, and changes in environmental parameters such as temperature, strain, pressure, force, and acceleration acting on tunnel diode 11. The temperature probe as herein taught is not subject to changes in pressure, force, and acceleration, so that these can be disregarded in this case, but can if desired be subject to strain to improve the linearity of the output temperature reading. It is also assumed that a constant voltage source 16 is used. Typical frequency vs. bias characteristics for such a tunnel diode oscillator are given in FIG. 4, which shows the curves obtained at two different temperatures. The maximum or peak frequency is at different bias voltages in the two curves.

The tunnel diode 21 serves as a bias correcting element by virtue of the fact that temperature variations will vary its forward voltage drop such that it increases or decreases the bias voltage to the tunnel diode 11 so that diode 11 is always operating at the peak frequency on the frequency vs. bias voltage curve. The curve 30 in FIG. 2 represents the frequency vs. temperature output of the tunnel diode transducer illustrated in FIG. 1. As shown in FIG. 2, curve 30 is virtually a straight line. In practice, it has been found that the maximum nonlinearity is about 2 percent of the temperature range involved.

Figure 3A:
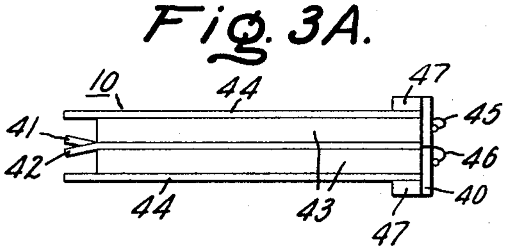
FIGS. 3A and 3B are respectively side and end views of one form of the sensor probe portion of the present invention.
Figure 3B:
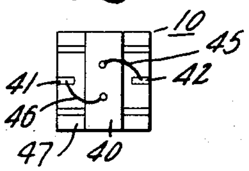

FIGS. 3A and 3B illustrate the construction of a sensor probe 10 which can be used in the circuit of FIG. 1. Also shown is a modification of the probe that may be made to provide a secondary compensation for non-linearities in the output frequency vs. temperature characteristic of the oscillator.

In FIGS. 3A and 3B., the temperature probe 10 is shown as comprising a common substrate 40 and leads the dots 45 and 46 for tunnel diodes 11 and 21, respectively. The PN junction for each diode is at the interface between substrate 40 and each of these dots. The structure is similar to that shown on an enlarged scale in FIGS. 12 and 13 of U.S. Pat. No. 3,277,717. Conductive leads 41 and 42 are connected to the tunnel diodes 11 and 21, respectively. An additional compensation for variations in temperatures may be obtained by utilizing an insulating element 43 attached to the common substrate 40 and having a temperature coefficient of expansion different from that of the common substrate 40. Thus, during a temperature change, the differential expansion rate between the insulator 43 and the substrate 40 will induce a strain on substrate 40. This strain will further modify the output frequency of the oscillator. Further information on strain sensitive tunnel diodes and the mechanism by which the strain modifies the output frequency of a tunnel diode oscillator is given in the inventor's U.S. Pat. No. 3,491,588 granted Jan. 27, 1970 and entitled "Strain Sensitive Tunnel Diode." As is well known, strain modulates the conduction mechanism of semiconductors.

To further describe the preferred embodiment of probe 10 shown in FIGS. 3A and 3B, insulating element 43 and leads 41, 42, and 44 are suitably fabricated as a printed circuit board construction. A laminate is formed by two metallic foil layers 44 adhered to the top and bottom surfaces of insulating element 43, and leads 41 and 42 are portions of a central foil layer embedded in the insulating element between the two outer layers 44. Typical materials are copper foil and paper phenolic, epoxy glass or aluminum for the insulator. Semiconductor substrate 40 is made of germanium or some other suitable semiconductor and has dimensions, for example, of 100 mils by 10 mils. Substrate 40 is secured to the end of the probe preferably by soldering to a pair of copper or other metal bars 47 which in turn are soldered transversely to the outer surfaces of metal layers 44 at the probe tip. As the temperature increases, insulating element 43 expands at a greater rate than substrate 40, thereby applying a tensile strain to the substrate through the soldered connection to bars 47 which separate slightly with the expansion of the insulating material. Straining oscillator tunnel diode 11 modifies the frequency of the tunnel diode oscillator.

Thus, it can be seen that the specific form of sensor probe 10 as illustrated in FIGS. 3A and 3B provides a means for insuring that the two tunnel diodes 11 and 21 are in close proximity to one another and sense the same temperature variations. Further, a sensor probe constructed as shown can have the added feature of the strain inducing element coupled to the substrate to provide a secondary means of temperature sensitivity; that is, the strain induced frequency variations can be used to balance out any remaining non-linearities that may exist after bias compensation.

Figure 4:
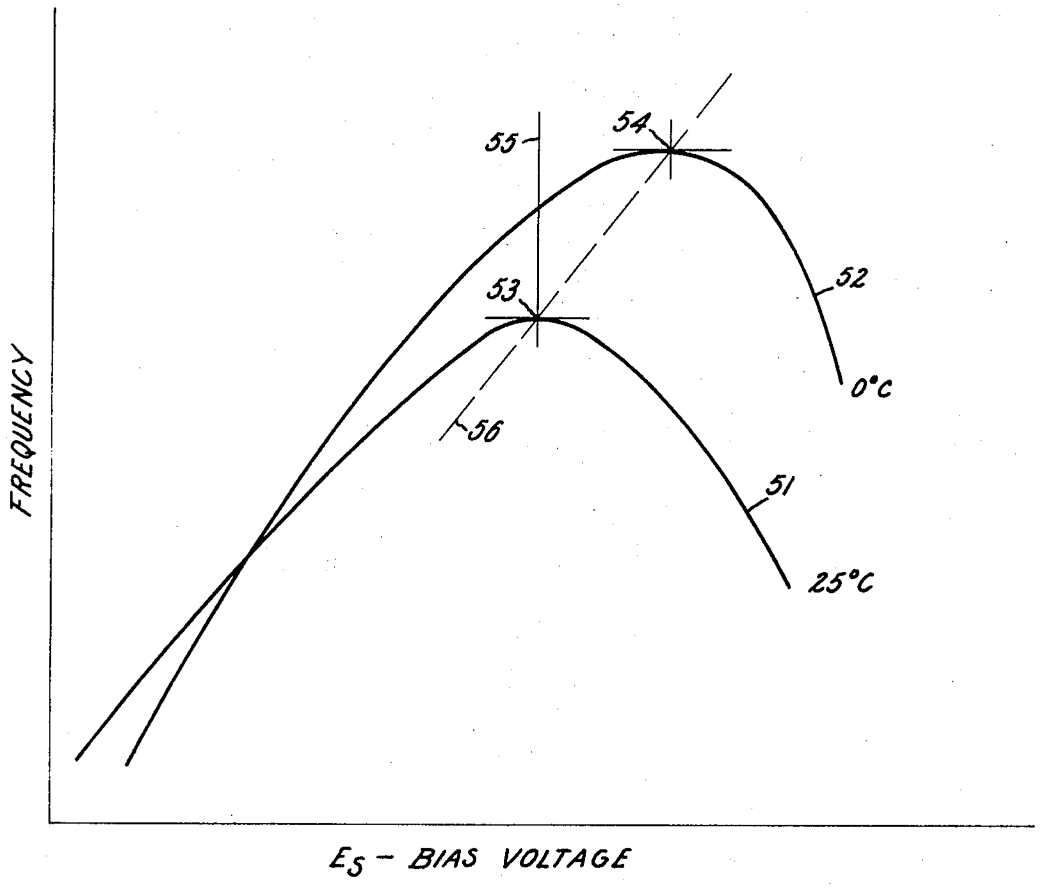
FIG. 4 represents the frequency vs. bias characteristic of an uncorrected and a corrected temperature sensor in accordance with the present invention.

In FIG. 4 there is illustrated the frequency vs. bias curves for a tunnel diode oscillator. As may be seen from the figure, a tunnel diode oscillator would operate along curve 51 at 25° C. and along curve 52 at 0° C. With variations in temperature, the respective peaks 53 and 54 of the curves 51 and 52 are displaced both in frequency and in bias voltage. Thus operating at a constant bias voltage, e.g., along line 55, would produce a non-linear frequency-temperature relationship. By varying the bias voltage with temperature so that operation is along line 56 instead, a linear frequency-temperature relationship results. Although a similar circuit is shown in FIG. 2 of U.S. Pat. No. 3,581,234 (Ser. No. 883,750) to Milton D. Bloomer, there is no recognition in that patent of the linear frequency-temperature characteristic that forms the basis of this invention. This patent, assigned to the same assignee as this invention may be referred to for further information as may be required.

What I claim as new and desire to secure by Letters Patent of the United States is:

1. A linear temperature transducer comprising
a source of first nd second value bias voltages,
a tunnel diode oscillator comprising a first temperature sensitive tunnel diode energized by said first value bias voltage to operate at a maximum frequency for a selected temperature, and
a temperature compensating circuit for said tunnel diode oscillator comprising a second temperature sensitive tunnel diode biased by said second value bias voltage so as to modify the first value bias voltage supplied to said first tunnel diode as a function of temperature and linearize the maximum frequencies of said tunnel diode oscillator over a range of temperatures,
whereby the frequency of said oscillator is a measure of the temperature.

2. A transducer as set forth in claim 1 wherein said tunnel diode oscillator includes an inductor connected in series with said first tunnel diode.

3. A transducer as set forth in claim 2 wherein said first and second tunnel diodes are mounted on a common probe in physical proximity.

4. A transducer as set forth in claim 3 further including means for straining said tunnel diodes as a function of temperature to further modify the frequency of said tunnel diode oscillator and improve the linearity of the frequency-temperature characteristic of said transducer.

* * * * *